United States Patent [19]

Clarke et al.

[11] Patent Number: 5,673,351
[45] Date of Patent: Sep. 30, 1997

[54] METHOD AND APPARATUS FOR INDUCING A TEMPORARY LOCALIZED TRANSMISSION LOSS IN A TELECOMMUNICATIONS CABLE

[75] Inventors: Kenneth Paul Clarke, Burwood; David Coulson, Beaconsfield Upper; Ernest Edward Gibbs, Endeavour Hills; Barry John Keon, Carnegie; Alfred Willem Kruijshoop, Mount Waverly, all of Australia

[73] Assignee: Telstra Corporation Limited, Melbourne, Australia

[21] Appl. No.: 522,367

[22] PCT Filed: Mar. 18, 1994

[86] PCT No.: PCT/AU94/00133

§ 371 Date: Nov. 15, 1995

§ 102(e) Date: Nov. 15, 1995

[87] PCT Pub. No.: WO94/22241

PCT Pub. Date: Sep. 29, 1994

[30] Foreign Application Priority Data

Mar. 18, 1993 [AU] Australia .................. PL7865/93

[51] Int. Cl.$^6$ ................... G02B 6/44; H01B 7/00; G01N 21/00
[52] U.S. Cl. .................... 385/100; 385/12; 385/123; 385/147; 385/140; 174/68.1; 356/73.1
[58] Field of Search ..................... 385/12, 13, 123, 385/127, 128, 147, 100, 140; 250/227.11, 227.14, 227.16, 227.18; 374/111, 113, 116, 100, 130, 131, 132; 174/68.1, 252, 70 R; 356/73.1

[56] References Cited

U.S. PATENT DOCUMENTS

| | | | |
|---|---|---|---|
| 4,362,057 | 12/1982 | Gottlieb et al. | 385/12 X |
| 4,417,782 | 11/1983 | Clarke et al. | 385/123 X |
| 4,505,542 | 3/1985 | Clarke | 385/12 X |
| 4,659,215 | 4/1987 | Sumida et al. | 356/73.1 |
| 4,729,627 | 3/1988 | Saito et al. | 385/13 X |
| 4,906,106 | 3/1990 | Kaufmann et al. | 385/12 X |
| 5,253,037 | 10/1993 | Klainer et al. | 385/12 X |
| 5,479,251 | 12/1995 | Hanson | 356/73.1 |
| 5,592,577 | 1/1997 | Tanoue | 385/123 X |

FOREIGN PATENT DOCUMENTS

208726 DD   4/1984   Germany .................. 385/12 X

OTHER PUBLICATIONS

Derwent Abstract Accession No. 92–233306/28, SU 1684750–A1, (Borisov KV) 15 Oct. 1991.

Patent Abstracts of Japan, E–1085, p. 25, JP, A. 3–85033 (Fujikura Ltd) 10 Apr. 1991, Abstract.

Culshaw, B. et al., "Fibre Optic Strain Pressure and Temperature Sensors", Proc. 4th European Conf. on Opt. Comm., Genoa, Italy, pp. 115–126, Sep. 1978.

*Primary Examiner*—Brian Healy
*Attorney, Agent, or Firm*—Wolf, Greenfield & Sacks, P.C.

[57] ABSTRACT

A method and apparatus for inducing a localised optical transmission loss in an optical fiber cable is described, which is particularly well suited for use with optical time-domain reflectometry (OTDR) equipment to aid in locating faults in an optical fiber cable. A small portion of the optical fiber cable is cooled, such as by immersion in a cryogenic liquid like liquid nitrogen, and fibres in the cooled cable portion exhibit localised optical transmission loss which can be detected as a point loss (26) with the OTDR trace (24). The technique of inducing the point loss is non-invasive, and the localised transmission loss disappears when the cable portion returns to the ambient temperature, without damage to the cable.

22 Claims, 4 Drawing Sheets

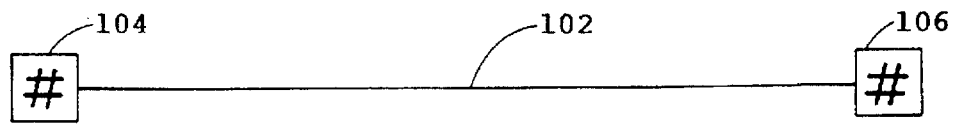
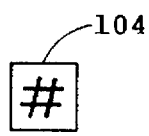
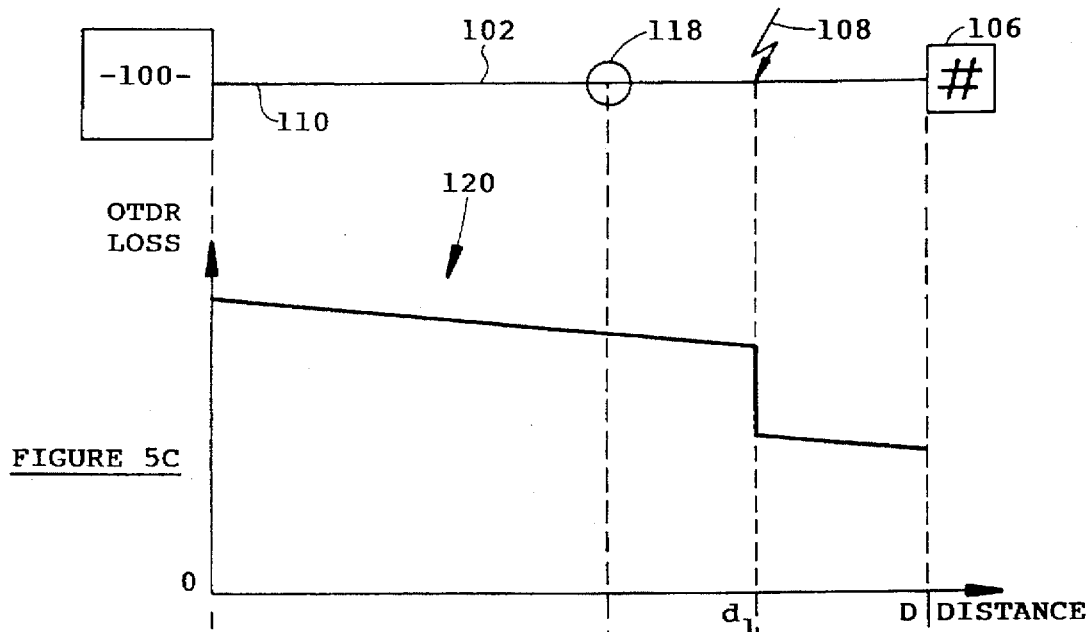
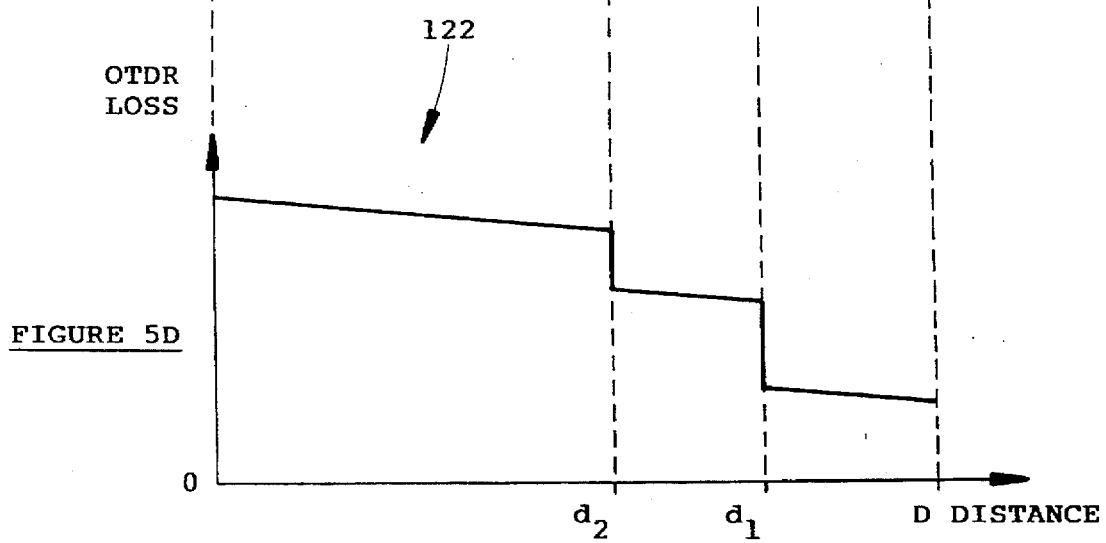

METHOD AND APPARATUS FOR INDUCING A TEMPORARY LOCALIZED TRANSMISSION LOSS IN A TELECOMMUNICATIONS CABLE

FIELD OF THE INVENTION

This invention relates to a method and an apparatus for inducing a temporary localised transmission loss (point loss) in a telecommunications cable. One particular form of the invention relates to inducing a temporary localised optical transmission loss in an optical fiber cable, which loss can be detected from one end thereof.

BACKGROUND OF THE INVENTION

In a communications system which utilizes optical fibres for the mission of signals over long distances, faults which may occur from time to time along the optical fibre mission path may be difficult to accurately locate. The optical fibres are commonly grouped together into an optical fibre cable in which a number of fibres are encased in various protective materials to enable the cable to be buried along the transmission path between telecommunications exchanges. A fault may occur at a point along the optical fibre cable by virtue of, for example, attack by termites or pressure from a rock where the cable is buried, which introduces a transmission loss for signals transmitted along the optical fibre affected by the fault. Along a long distance optical fibre telecommunications path there may be up to 50 km of optical fibre cable between telecommunications exchanges, and perhaps 2 to 20 km between splices in the optical fibre cable.

Optical time domain reflectometry (OTDR) is a technique which may be used to determine the approximate position of a point loss in an optical fibre from a remote end of the fibre. The use of OTDR for fault location is quite well known, and examples of its application may be found in:

Advances in Optical Time-Domain Reflectometry
Mitsuhiro Tateda and Tsuneo Horiguchi
Journal of Lightwave Technology, Vol. 7, No. 8, Aug. 1989

Novel Coherent Heterodyne Optical Time Domain Reflectometry for Fault Localization of Optical Amplifier Submarine Cable Systems Yukio Horiuchi, Shiro Ryu, Kiyofumi Mochizuki and Hiroharu Wakabayashi
IEEE Photonics Technology Letters, Vol. 2, No. 4, Apr. 1990

OTDR in Optical Transmission Systems Using Er-Doped Fiber Amplifiers Containing Optical Circulators
Yoshiaki Sato and Koh-ichi Aoyama IEEE Transactions Photonics Technology Letters, Vol. 3, No. 11, Nov. 1991

Briefly, the OTDR apparatus generates a pulse of light from a laser diode and launches it through a directional coupler into the optical fibre to be measured. Reflected light returning to the OTDR receiver is directed by the directional coupler to a detector and converted into an electrical signal. The timing of pulse reflections detected at the OTDR receiver is indicative of the distance along the optical fibre of the cause of such reflections, which may be determined from a trace of the OTDR receiver output. An intrinsic mechanism of losses in an optical fibre results from Rayleigh scattering, which is caused by continuous microscopic refractive index variations "frozen" into the fibre during the production process. This is a property of the material and cannot be eliminated. As a result, small mounts of light are scattered in all directions throughout the fibre and some of this scattered light is captured by the fibre and guided back to the OTDR receiver. This light is referred to as back scattered light, and is observable on an OTDR trace as a continuous slope indicating continuous loss along the length of the fibre. Point losses are also observable by use of OTDR, and these may result, for example, from fibre splices or increased micro bending losses at a point of the fibre. A fault along an optical fibre cable, such as a kink in the cable or a damaged or broken optical fibre therein results in a point loss causing reflected or back scattered light which may be observed on an OTDR trace.

The accuracy with which a fault can be located along an optical fibre cable depends on a number of factors, many outside that of the resolution of the OTDR instrument itself. In addition to the resolution limits of the OTDR instrument, one factor which may affect the accuracy with which a fault can be located is the discrepancy which can occur between the optical path length and the physical length of the optical fibre cable exterior. Since OTDR relies upon signals transmitted along the fibres themselves, the distances determined thereby relate to the distance along the actual optical fibre within the optical fibre cable. The outer sheath of the optical fibre cable is commonly marked with a series of length measurements which reflect the measured distance from one end of the cable along the exterior thereof. However, since a typical optical fibre path within the cable is not straight, there can be discrepancies between the optical length measured along an optical fibre and the exterior length measured along the outer sheath of the cable. Consequently, a particular optical distance indicated by OTDR may not necessarily reflect the position of a fault with respect to the length markings on the exterior of the optical fibre cable. Also, the cable marking may not be continuous as a result of previous cable repairs. The replacement of a section of cable by new cable can create a discontinuity in the cable marking. Therefore, on long cable spans, use of the OTDR apparatus may only be able to locate a fault to within ±100 meters. If the optical fibre cable must be excavated and inspected in order to correct the fault then a location resolution of only ±100 meters may require up to 200 meters of cable to be excavated to reach the location of the cable fault. The efficiency of fault correction can therefore be greatly improved by increased accuracy of fault location procedures before excavation of long lengths of cable.

SUMMARY OF THE INVENTION

It has been found that the introduction of a temporary point loss into the fibres of a cable at a position close to that of the suspected fault provides a reference loss on the OTDR trace from which the position of the actual fault can be inferred with greater accuracy.

In accordance with the present invention there is provided a method for inducing a temporary localised transmission loss at a point along a telecommunications cable by temporarily cooling a portion of the telecommunications cable.

According to one aspect of the invention, the telecommunications cable comprises an optical fiber cable whereby an optical transmission loss is induced by cooling said portion of the cable.

In another aspen of the invention, the telecommunications cable comprises an electrical telecommunications cable whereby a variation of the cable dielectric characteristic is induced by cooling said portion of the cable.

In one embodiment of the invention the cable is cooled by applying a cryogenic liquid, such as liquid nitrogen, to the exterior thereof. In another embodiment, the cable is cooled by a cryogenic refrigerator, or a cable clamp is cooled in a cryogenic refrigerator and then applied to the cable exterior to effect heat transfer therebetween.

The present invention also provides apparatus for inducing a temporary localised optical transmission loss at a point along a telecommunications cable, comprising a cooling means for cooling a portion of the telecommunications cable.

Where the carrier comprises an optical fiber cable the transmission loss is an optical loss observable by way of OTDR, whereas if the carrier comprises an electrical telecommunications cable cooling of the cable induces a temporary variation in the dielectrical characteristic of the cable which can be observed using radio frequency time-domain reflectometry.

The cooling means may comprise a means for applying a liquid having a low boiling point, such as liquid nitrogen, to the exterior of the cable portion or may comprise a clamping means which is cooled to a low temperature and clamped to the cable exterior.

In a particularly simple and advantageous embodiment of the invention, liquid nitrogen is applied to the exterior of the cable portion by encasing the cable portion in an insulative container and introducing the liquid nitrogen into the container so as to surround the cable portion.

The invention also provides a method for enabling identification of a position along the length of an optical fibre cable comprising cooling a portion of the cable at said position to a temperature at which a point loss is observable on an optical time-domain reflectometer.

The invention further provides a method for locating a fault along a length of optical fibre cable comprising observing a fault loss resulting from the fault utilising optical time-domain reflectometry (OTDR), cooling a portion of the cable at a position along the cable length estimated from the observed fault loss to a temperature at which an induced point loss is observable, and locating the fault position by estimating the distance between the fault position and the position of the cooled cable portion utilising the observed OTDR fault loss and induced point loss.

BRIEF DESCRIPTION OF THE DRAWINGS

The invention is described in detail hereinafter, by way of example only, with reference to the accompanying drawings, wherein:

FIG. 5A is a schematic diagram of an optical fiber cable link between adjacent exchanges in an optical fiber network;

FIG. 5B is a schematic diagram of a fault location system in which OTDR equipment is applied to the optical fiber cable link of FIG. 5A; and FIGS. 5C and 5D are representations of OTDR traces from the system of FIG. 5B.

DETAILED DESCRIPTION

In order to apply OTDR to an optical fibre cable it is necessary to be able to introduce a light pulse into the optical fibres thereof, and detect reflections of the light pulse in the optical fibres. This is most easily done at a telecommunications exchange where the fibres may be terminated and signals thereon switched from one telecommunications path to another. As mentioned, along long spans of optical fibre there may be up to 50 km or more between adjacent exchanges. The optical fibre cable may comprise a number of 2 to 20 km lengths of cable spliced together between adjacent exchanges. Typically some loss occurs at the points at which the cables are spliced, and these losses may be detected and observed on an OTDR trace. A typical optical fibre cable may comprise between 6 to 144 optical fibres encased in a variety of protective materials so that damage to the fibres themselves may be minimised.

Figure 1:
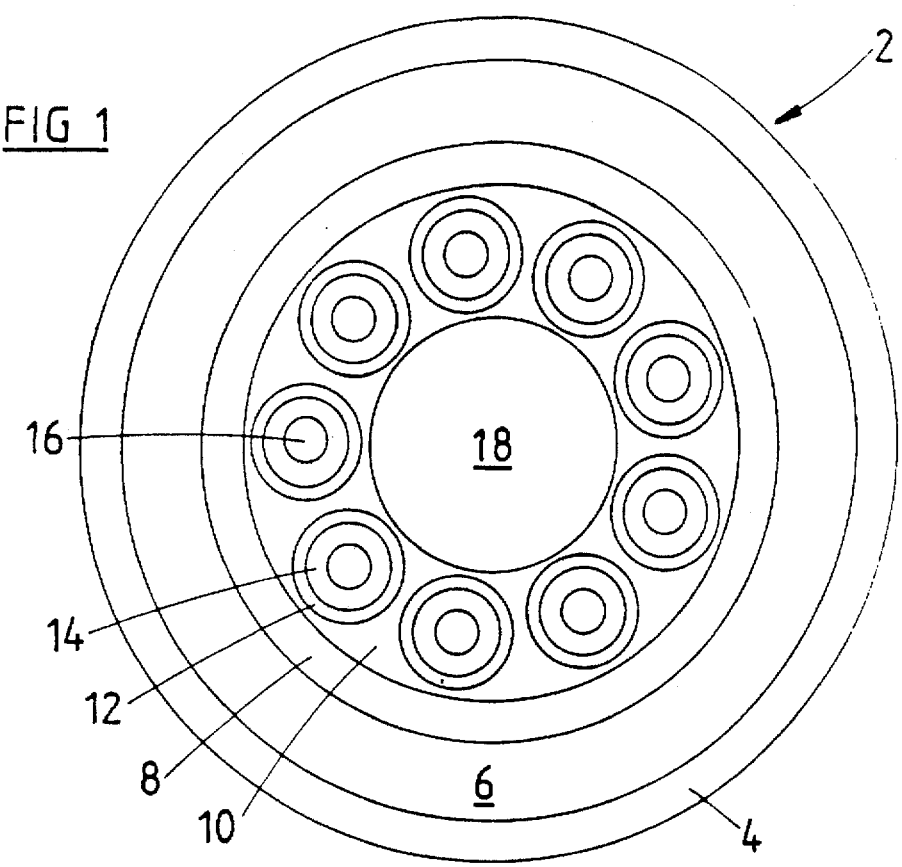
FIG. 1 illustrates a cross-sectional view of an optical fibre cable.

FIG. 1 shows a cross-sectional view of an optical fibre cable 2 which carries 9 optical fibres 16 therein. Each fibre 16 is enclosed in a plastic tube 12 and surrounded by a tube filler 14 which may comprise, for example, a silicon or carbon based grease. The tubes 12 are arranged around a central structural dement or strength member 18 constructed of, for example, glass reinforced polyester (GRP). The tubes 12 and strength member 18 are surrounded by an interstitial filler 10, which may be of similar composition to the tube filler 14, and encased in a robe of kevlar material 8. The kevlar 8 is in turn encased in a polyester shell 6, which is itself encased by a nylon outer sheath 4. An alternative cable construction (not illustrated) which is also widely used is referred to as a slotted core design, and has the optical fibres 16 positioned in slots formed in the central core 18 of the cable and surrounded by the interstitial filler 10.

Figure 3:
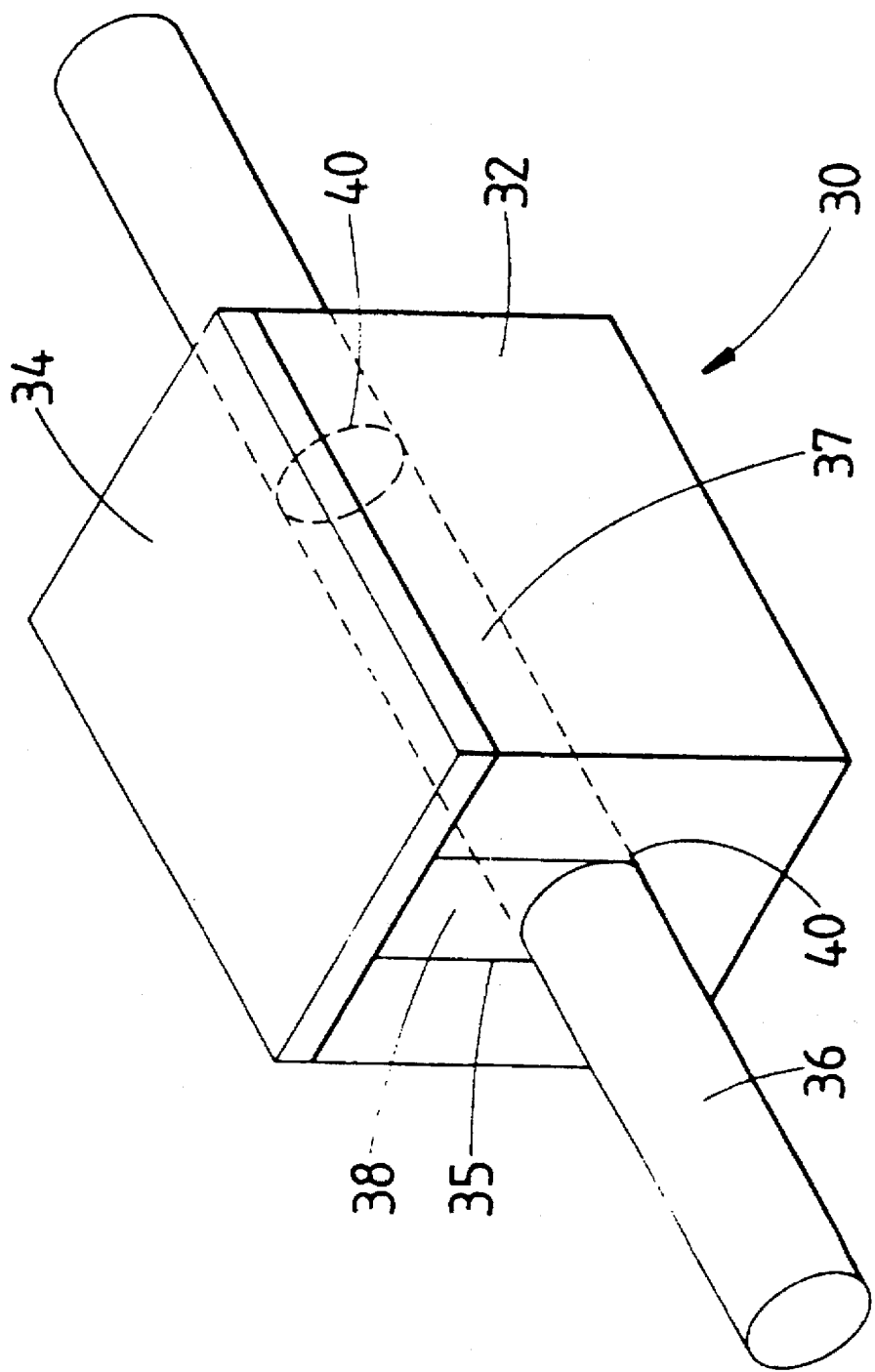
FIG. 3 shows apparatus in accordance with a first embodiment of the invention.

In FIG. 3 there is shown a cooling apparatus 30 in accordance with an embodiment of the invention, which may be utilised to cool a portion of an optical fibre cable 36. The cooling apparatus 30 comprises a box like container 32 constructed of a thermally insulative material such as a polystyrene material. The container 32 is adapted to enable the cable 36 to pass therethrough, and for this purpose a slot 35 is provided in two opposed side surfaces of the container. The slots 35 are shaped to enable the cable 36 to lie in the bottom thereof, and insert portions 38 are provided to fill the remainder of the slots 35 after the cable 36 is seated therein. The container 32 is hollow such that the cable 36, in use, passes through the hollow interior whereby a portion 37 of the cable 36 between the entry and exit points 40 is exposed to the interior of the container 32. In order to facilitate cooling of the cable portion 37 within the container 32, the container is filled with a sufficient amount of liquid nitrogen such that the interior cable portion 37 is surrounded thereby. To prevent leakage of the liquid nitrogen from around the entry and exit points and the edges of slots 35 a sealing agent may be applied, such as a petroleum jelly. To minimise evaporation of the liquid nitrogen within the container 32, the container may also be provided with a lid 34. The interior length of the container 32 in the longitudinal direction of the cable 36 is, in the preferred embodiment, approximately 200 mm and its capacity approximately 2000 millilitres. However, as described hereinbelow, the mount of liquid nitrogen required to be expended to cool the portion of the cable 36 may only be approximately 200 millilitres.

The above described apparatus has been implemented experimentally on various types of single mode optical fibre (SMOF) cable, including both slotted core and loose tube designs. These investigations were made by cooling cables and monitoring the performance of the fibres within the cables using OTDR. Where cable or fibre temperatures are quoted, they were measured using thermocouples inserted into cable tubes adjacent the fibres. The OTDR source wavelengths used were 1300 nm and 1550 nm.

Cooling of the optical fibre cable was effected using liquid nitrogen, which has a boiling point of +196° C. The liquid nitrogen was constrained to surround the cable portion by use of a polystyrene container of the type described in relation to FIG. 3. The entry and exit points 40 of the container were sealed at each end using a compliant cream or jelly. Various types of cream or jelly were tried and it was found that a standard hand cream such as Amada Protective Cream type WS16 performed well. To provide an assessment of the length of cable required to be cooled to produce a measurable loss, two different reservoirs were used. One had a length adapted to cool a cable portion of approximately 50 mm, and the other approximately 200 mm.

A loss reflection was observed for the fibres within an optical fibre cable when the cable was cooled to below −120° C. The magnitude of the loss was found to depend upon the length of cable cooled, on the temperature of the fibres within the cable, and on the position of the cooled segment of cable. The position sensitivity was observed when the 50 mm reservoir was used, but not for the 200 mm reservoir. Experiments on solitary fibres (that is fibres retaining their protective polymer coating but not within a cable or tube) failed to produce any observable loss reflection even at temperatures below −160° C.

Figure 2:
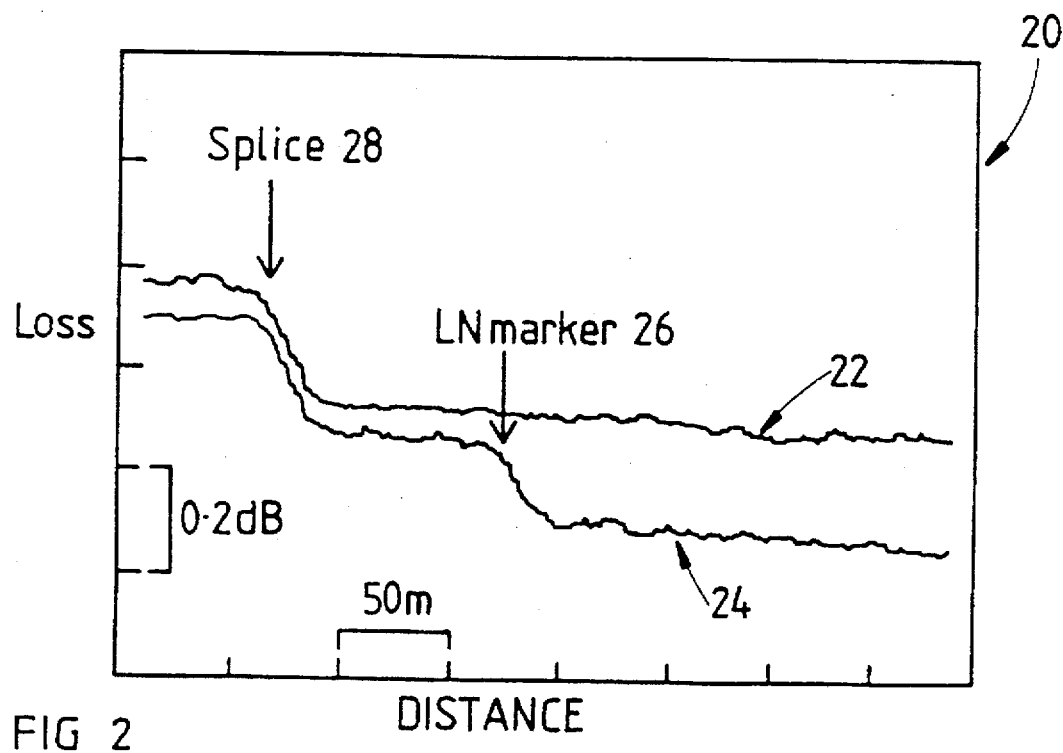
FIG. 2 illustrates an OTDR trace showing the results of application of an embodiment of the invention.

Field experiments were performed on a length of SMOF cable, and FIG. 2 is a graph 20 showing experimental results in the form of a portion of two OTDR traces 22 and 24. The results of FIG. 2 were obtained by use of OTDR apparatus with range set at 8 km, wavelength of 1550 nm and pulse width of 200 nanoseconds. Initially an OTDR trace was obtained for an optical fibre in the experimental cable under ordinary conditions, and OTDR trace portion 22 indicates the results obtained along a section of the cable containing a fibre splice. The loss observed on the OTDR trace as a result of the fibre splice is indicated at 28. A portion of the cable about 100 m from the fibre splice was then subjected to 10 minutes of cooling within the liquid nitrogen and the OTDR measurements were repeated. The OTDR trace portion 24 indicates the point loss 26 observed in an optical fibre of the loose tube type cable following application of the liquid nitrogen utilising the 200 mm long reservoir. The observed point loss 26 caused by the liquid nitrogen cooling was approximately 0.2 dB.

After the liquid nitrogen was emptied from the container the cooling losses rapidly disappeared, over an interval of about 5 minutes, from the OTDR trace. The outer surface of the cable required a further 20 minutes to return to ambient temperature. There was no apparent damage incurred by the cable as a result of the application of the liquid nitrogen, and no residual transmission losses were observed on the OTDR trace.

The two principal effects to be considered in calculating the required cooling power or capacity are:

i. the amount of heat stored in the cable just to cool it to the required temperature; and ii. the continuous removal of heat being conducted into the cooled section from the warm cable at either end.

The first effect depends on the heat capacity of the cable, the volume of cooled cable, and the temperature drop required. For non-metallic optical fibre cables with a diameter of 20 mm the heat capacity is approximately one kilojoule per meter of cable. The second effect depends on the thermal conductivity of the cable components, and has been determined to be about a Watt for an average SMOF cable.

The cooling capacity required to cool the cable portion initially from ambient temperature, which requires that heat be transferred through the outer jacket only, may also be estimated. This depends on each of the above factors, as well as the transverse thermal conductivity of the cable. For a typical SMOF cable the initial cooling power required is about 200W per meter of cable. Note that this power requirement reduces rapidly as the cable core temperature lowers. To maintain the cable at its minimum temperature requires only the removal of the heat input to the cooling medium via mechanism ii. above plus other sundry heat inputs. For an insulated cooling medium these will total of the order of a few Watts. It should be noted, however, that these calculations are for cable without any metal components. The incorporation of metallic strength members or armouring will significantly change the cooling requirements.

Liquid nitrogen is widely available due to its extensive application in medical and agricultural fields. It has a boiling point of −196° C., has good heat capacity and a large latent heat of vaporisation, and is ideal to be used in the cooling of relatively small objects such as short lengths of cable. It also has the inherent advantage that use of a liquid to transfer heat to or from a solid is a very efficient thermal process. The calculations discussed above suggest that the volume of liquid nitrogen required to cool a 200 mm length of 20 mm diameter SMOF cable is about 200 ml. Thereafter the boiling off of only a few millilitres of liquid nitrogen per minute will maintain the cable temperature. These volumes, which are quite small and easily handled and transported, have been confirmed in practice.

As mentioned, the preferred method of cooling a cable portion for the purposes of the invention is the same as that used for the experimental investigation of the technique. Almost any small insulative container can be used as the reservoir, after suitable modification to produce two slots to allow the cable to rest within the reservoir. Major advantages of this method of cooling the cable are that the basic reservoir is cheap, readily available, and can be modified locally to suit any cable diameter. Its use will also ensure that there is little wasted liquid nitrogen, as the volume required to fill the container to sufficient depth to cover the cable will be comparable to the minimum values quoted above as necessary to cool the cable.

Figure 4:
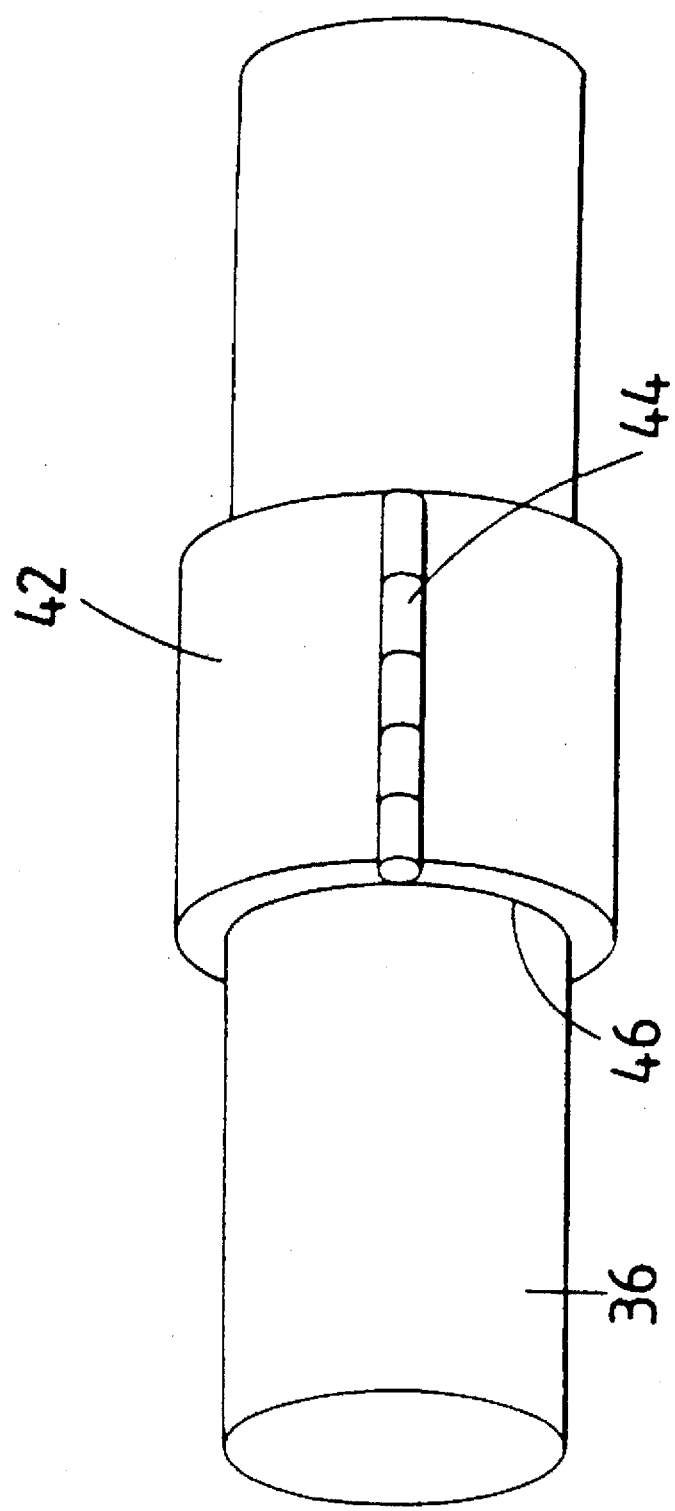
FIG. 4 shows apparatus in accordance with a second embodiment of the invention.

An alternative means for cooling a portion of an optical fibre cable 36 is illustrated in FIG. 4. An adjustable clamp 42, hinged at 44, may be clamped around the cable 36 to provide heat transfer therebetween. The clamp 42 could be filled with liquid nitrogen to achieve a cooling effect, or may be of a form having a large heat capacity and cooled prior to application to the cable 36. In order to cool a clamp 42 to a temperature sufficient to effect the necessary heat transfer from the cable 36, cooling for a number of hours in a cryogenic refrigerator would be required. Also, the clamp 42 relies on thermal transfer between two solids, which can be quite poor unless the surfaces are clean and well matched in shape and size. A low temperature heat transfer compound may be applied to the surface 46 between the clamp 42 and cable 36, to improve heat transfer therebetween.

All polymers have a particular temperature, known as the glass transition temperature, above which they behave like robbery materials, and below which they are extremely brittle. The temperatures used experimentally to achieve observable transmission losses in the cable fibres are much lower than the glass transition temperatures of the polymers utilised in the cable construction. Therefore the cable and its polymer components will be extremely brittle whilst subjected to the freezing temperatures, and should not be subjected to any bending or twisting forces during cooling thereof. However, this is not anticipated as a major difficulty, since the cooling method will generally be applied to cables in situ and there should be no need to move the cable either before, during or after cooling of a portion thereof.

FIG. 5A shows a schematic diagram of a length of optical fiber cable 102 extending between adjacent exchanges 104, 106 in an optical fiber network. During normal operation, fibers in the cable 102 are connected to exchange equipment at exchange 104. Consider that a fault 108 affects transmission of signals transmitted along a fiber 110 in the cable 102, by introducing a point loss as described above. In order to observe the characteristics of the fault 108, such as the magnitude of loss and estimated position along the fiber cable 102, the fiber 110 is temporarily disconnected from exchange equipment at the exchange 104, and instead connected to the OTDR 100 as shown in FIG. 5B. Alternatively, the OTDR 100 may be coupled to one of the fibers 110 in the cable 102 by way of an optical coupler.

A schematic representation of an OTDR trace 120 which could be expected from the system described above is shown in FIG. 5C. The horizontal axis of the trace 120 represents a measure of distance from the OTDR position (origin) to the exchange 106 which is furthest from the OTDR at distance D, whilst the vertical axis of the trace represents a measure of signal power loss in decibels (dB). The trace 120 illustrates a characteristic continuous loss over distance resulting from effects such as Rayleigh scattering, as discussed above, and a noticeable loss due to the fault 108. An estimated position for the fault 108 can be inferred from the OTDR trace, which is calibrated in distance units. However, due to the discrepancy which can occur between the optical path length and the physical length of the optical cable exterior, the position on the exterior of the cable, where fault 108 as inferred from the trace 120 is located, may not be accurately known. The best estimate of the fault location, on the exterior of the cable, may in fact correspond to a different, but nearby position on the cable 102, such as the position indicated at 118 in FIG. 5B. Therefore, in accordance with one application of the present invention, a temporary localised transmission loss can be induced at the point 118 on the cable 102, such as by freezing with liquid nitrogen as described above. Having introduced a point loss at point 118 along the cable 102, a further OTDR trace can be taken, which is represented schematically in FIG. 5C as trace 122. The loss induced by cooling the point 118 of the cable 102 can be observed on the trace 122. This provides a reference point which is observable both on the OTDR trace 122 at a position $d_2$, and observable at a physical location 118 on the cable 102 where the point loss was induced. Thus by measuring the distance between the observed losses at points $d_1$ and $d_2$ on the trace 122, a greater accuracy for the physical position of the fault 108 can be inferred since the position 118 already located is likely to be quite close to the fault position.

In summary, the foregoing detailed description of embodiments of the invention relates to the cooling of the optical fibre cable to very low temperatures (ie. much lower than 0° C.) in order to induce a temporary localised transmission loss (,point loss) to enable the observation of such a point loss by OTDR in optical fibres carried within the cable. From the experimental results discussed above, it can be inferred that the generation of the fibre transmission loss depends upon the development of abnormal stresses upon the fibres within the cable. As no point loss was observed in solitary cooled fibres, it may also be inferred that the stresses arise from freezing of the greases used in the cable, either those within the tubes (tube filler 14) or surrounding the tubes (interstitial filler 10). It is thought that contraction of the greases upon freezing thereof results in abnormal pressure upon the fibres, creating an increase in microbend losses. It must be borne in mind, therefore, that the temperature required to achieve an observable loss on an OTDR trace will depend upon the constituents of the cable construction, and may vary from one cable type to another.

Whilst the invention described thus far relates to inducing a temporary localised optical transmission loss, temporary changes in other physical properties of the optical fiber cable can also be induced by temporarily cooling a portion of the cable in accordance with the invention.

For example, a temporary localised strain can be induced at a point along the optical fiber cable. This strain can be observed utilising Brillouin time-domain reflectometry (B-OTDR). Briefly a B-OTDR system has a continuous wave (CW) laser source at one end of an optical fiber length and an OTDR apparatus at the other end of the optical fiber. The wavelength of light from the CW laser source is carefully matched to the wavelength of the pulses of light from the OTDR. The two light signals interact as they propagate in opposite directions along the optical fibre, and the signal interactions are affected by strains along the optical fiber. The OTDR receiver detects both the light from the CW laser source and the reflected signals.

Furthermore, temporary localised changes in other physical properties of many types of electrical communication cable (such as coaxial and copper twisted pair) can be induced by temporarily cooling a portion of the cable. As an example, a temporary localised variation of the dielectric constant of a coaxial line can be induced at a point along an electrical communication cable. This temporary localised variation in dielectric constant can be observed utilising time-domain relectometry (TDR) in the radiofrequency (MHz) part of the electromagnetic spectrum.

The foregoing detailed description has been put forward merely by way of explanation only, and is not intended to be limiting to the invention as defined in the claims appended hereto.

We claim:

1. A method for inducing a temporary localised transmission loss at a point along a telecommunications cable by temporarily cooling a portion of the telecommunications cable.

2. A method as claimed in claim 1, wherein the telecommunications cable comprises an optical fiber cable whereby an optical transmission loss is induced by cooling said portion of the cable.

3. A method as claimed in claim 1, wherein the telecommunications cable comprises an electrical telecommunications cable whereby a variation of the cable dielectric characteristic is induced by cooling said portion of the cable.

4. A method as claimed in claim 2 or 3, wherein cooling of the cable portion is effected by application of a cryogenic liquid to the exterior thereof.

5. A method as claimed in claim 4, wherein liquid nitrogen is applied to the exterior of the cable portion.

6. A method as claimed in claim 2 or 3, wherein cooling of the cable portion is effected by a cryogenic refrigerator adapted to fit around the cable portion exterior.

7. A method as claimed in claim 2 or 3, wherein cooling of the cable portion is effected by cooling a cable clamp in a cryogenic refrigerator and applying the cooled cable clamp to the cable exterior to effect heat transfer therebetween.

8. A method as claimed in claim 4 including the steps of fitting an insulative vessel around the cable portion exterior surface and introducing liquid nitrogen into the vessel so as to at least substantially surround the cable portion exterior surface therewith.

9. Apparatus for inducing a temporary localised optical transmission loss at a point along a telecommunications cable, comprising a cooling means for cooling a portion of the telecommunications cable.

10. Apparatus according to claim 9, wherein the telecommunications cable comprises an optical fiber cable such that an optical transmission loss is induced by cooling said portion of the cable.

11. Apparatus according to claim 9, wherein the telecommunications cable comprises an electrical telecommunications cable such that a variation of the cable dielectric characteristic is induced by cooling said portion of the cable.

12. Apparatus according to claim 10 or 11, wherein the cooling means comprises a means for applying a liquid having a low boiling point to the exterior of the cable portion.

13. Apparatus according to claim 12 wherein the cooling means comprises a means for applying liquid nitrogen to the exterior of the cable portion.

14. Apparatus according to claim 12 wherein the cooling means comprises an insulative vessel adapted to be fitted around the exterior surface of the cable portion for containing said liquid so as to, in use, at least substantially surround the cable portion.

15. Apparatus according to claim 10 or 11, wherein the cooling means comprises a clamping means having a relatively large heat capacity and adapted to be cooled to a low temperature and clamped around the cable portion exterior to effect heat transfer therebetween.

16. Apparatus according to claim 10 or 11, wherein the cooling means comprises a cryogenic refrigeration means adapted for application to the cable portion exterior.

17. A method for enabling identification of a position along a length of a telecommunications cable comprising cooling a portion of the telecommunications cable at said position to a temperature at which a point loss is observable on a time-domain reflectometer.

18. A method according to claim 17 wherein the telecommunications cable comprises an optical fiber cable whereby the cooled cable portion is, in use, observable as a point loss on an optical time-domain reflectometer.

19. A method according to claim 17 wherein the telecommunications cable comprises an electrical telecommunications cable.

20. A method for locating a fault along a length of optical fibre cable comprising observing a fault loss resulting from the fault utilising optical time-domain reflectometry (OTDR), cooling a portion of the cable at a position along the cable length estimated from the observed fault loss to a temperature at which an induced point loss is observable, and locating the fault position by estimating the distance between the fault position and the position of the cooled cable portion utilising the observed OTDR fault loss and induced point loss.

21. A method as claimed in claim 20, wherein cooling of the cable portion is effected by application of a cryogenic liquid to the exterior thereof.

22. A method as claimed in claim 20 or 21 wherein the cable portion is cooled by fitting an insulative vessel around said cable portion exterior surface and introducing liquid nitrogen into the vessel so as to at least substantially surround the cable portion exterior surface therewith.

* * * * *